(12) United States Patent
Bijavara Aswathanarayana Rao et al.

(10) Patent No.: US 11,153,175 B2
(45) Date of Patent: Oct. 19, 2021

(54) LATENCY MANAGEMENT BY EDGE ANALYTICS IN INDUSTRIAL PRODUCTION ENVIRONMENTS

(71) Applicant: International Business Machines Corporation, Armonk, NY (US)

(72) Inventors: Dattaram Bijavara Aswathanarayana Rao, Bangalore (IN); Saurabh Gupta, Houston, TX (US); Rakesh Sharma Mangala Nagendra Rao, Bangalore (IN); Vishwanath Narayan, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 15/784,473

(22) Filed: Oct. 16, 2017

(65) Prior Publication Data
US 2019/0116091 A1    Apr. 18, 2019

(51) Int. Cl.
| | | |
|---|---|---|
| *G06N 7/00* | (2006.01) | |
| *G06N 5/04* | (2006.01) | |
| *G06N 20/00* | (2019.01) | |
| *H04L 12/24* | (2006.01) | |
| *H04L 29/08* | (2006.01) | |
| *H04W 4/70* | (2018.01) | |
| *H04W 4/50* | (2018.01) | |
| *H04L 12/26* | (2006.01) | |

(52) U.S. Cl.
CPC .......... *H04L 41/142* (2013.01); *G06N 5/047* (2013.01); *G06N 7/005* (2013.01); *G06N 20/00* (2019.01); *H04L 41/16* (2013.01); *H04L 67/322* (2013.01); *H04W 4/50* (2018.02); *H04W 4/70* (2018.02); *H04L 41/08* (2013.01); *H04L 41/147* (2013.01); *H04L 43/0852* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,647,131 | B1 | 1/2010 | Sadowski et al. |
| 10,816,351 | B1 * | 10/2020 | Yao .................... G01C 21/3492 |
| 2006/0173857 | A1 | 8/2006 | Jackson |
| 2009/0285117 | A1 * | 11/2009 | Wang .................... H04L 41/142 370/253 |

(Continued)

OTHER PUBLICATIONS

Cheng et al., "GeeLytics: Geo-distributed Edge Analytics for Large Scale IoT Systems Based on Dynamic Topology", 6 pages, 978-1-5090-0366-2/15, © 2015 IEEE.

(Continued)

*Primary Examiner* — Kate H Luo
(74) *Attorney, Agent, or Firm* — William H. Hartwell

(57) ABSTRACT

A method, computer program product, and computer system are disclosed. The method includes determining probability of high data flow event, memory requirements for the high data flow and time to high data flow event by using pattern recognition based on natural language Processing (NLP), machine learning and statistical algorithms. The method applies a configuration to the edge device and network system when the probability of high data flow event is above a predetermined threshold for handling the high data flow event.

20 Claims, 6 Drawing Sheets

(56) References Cited

U.S. PATENT DOCUMENTS

| | | | | |
|---|---|---|---|---|
| 2013/0111547 | A1* | 5/2013 | Kraemer | G06F 21/56 |
| | | | | 726/1 |
| 2014/0152464 | A1 | 6/2014 | Smith | |
| 2015/0221218 | A1* | 8/2015 | Downs | G08G 1/0129 |
| | | | | 701/119 |
| 2016/0241482 | A1* | 8/2016 | Tsuruoka | H04L 47/621 |
| 2016/0261510 | A1* | 9/2016 | Burnette | H04L 47/25 |
| 2017/0012870 | A1* | 1/2017 | Blair | H04L 12/4633 |
| 2017/0060574 | A1 | 3/2017 | Malladi et al. | |
| 2017/0339022 | A1* | 11/2017 | Hegde | G06N 3/0445 |
| 2017/0359264 | A1* | 12/2017 | Bird | H04L 47/2416 |
| 2017/0374090 | A1* | 12/2017 | McGrew | H04L 47/2483 |
| 2018/0026891 | A1* | 1/2018 | Vasseur | H04L 47/127 |
| | | | | 370/235 |
| 2019/0336097 | A1* | 11/2019 | Bregman-Amitai | G06K 9/627 |

OTHER PUBLICATIONS

"The Cisco Edge Analytics Fabric System", A new approach for enabling hyperdistributed implementations, CISCO, White Paper, 22 pages, © 2016 Cisco and/or its affiliates, All rights reserved, This document is Cisco Public.

* cited by examiner

```
----------------------------------------------------
 #    SIZE  TIMESTAMP          SOURCE     DESTINATION
----------------------------------------------------
. . . . . .
1026  62    20160805071203111  10.0.0.1   -> 312.0.27.254
1027  46    20160805071204208  10.0.1.2   -> 312.0.27.254
1028  76    20160805071204357  10.0.1.7   -> 312.0.27.254
1029  62    20160805071204782  10.0.29.7  -> 312.0.27.254
1030  74    20160805071205133  10.0.1.3   -> 312.0.27.254
1031  90    20160805071205231  10.0.0.4   -> 312.0.27.254
. . . . . .
```

FIG. 6

LATENCY MANAGEMENT BY EDGE ANALYTICS IN INDUSTRIAL PRODUCTION ENVIRONMENTS

BACKGROUND OF THE INVENTION

The present invention relates generally to the field of latency management, and more particularly to latency management by performing network analytics on edge devices.

The proliferation of embedded computing devices in everyday objects has enabled unparalleled connectivity of devices, including electronics, software, sensors, and actuators, among others, in computer networks. The term Internet of Things (IoT) refers to this dynamic network of globally connected things, entities, devices, items, or objects. Similarly, the term Industrial Internet of Things (IIoT) refers to the use of IoT technologies in manufacturing and production environments. As such, IoT can include, without limitation, a company or enterprise in which numerous items are communicatively interconnected such as computers, mobile devices (e.g., phones, laptops or tablets), lighting and climate control systems, cars or other vehicles, "smart" appliances (e.g., refrigerators, televisions, and manufacturing devices) where some or all of those devices can be controlled or interacted with remotely.

SUMMARY

Embodiments of the present invention disclose a method, a computer program product, and a system for reconfiguration of an edge device based on parameters to handle a high data flow event. The method may include receiving a first set of network data and utilizing a machine learning model to determine a probability of a high data flow event based on the first set of network data, where the machine learning model is trained using historical network data and historical configuration parameters implemented by a server computer in response to the historical network data. The method may also include, in response to determining that the probability of the high data flow event based on the first set of network data is below a predetermined threshold, process the first set of network data according to a default configuration parameter. The method may additionally include receiving a second set of network data and utilizing the machine learning model to determine a probability of a high data flow event based on the second set of network data. The method may further include, in response to determining that the probability of the high data flow event based on the second set of network data is above the predetermined threshold, processing the second set of network data according to a high data flow configuration parameter, wherein the high data flow configuration parameter is determined utilizing the machine learning model.

BRIEF DESCRIPTION OF THE DRAWINGS

FIG. 6 illustrates an exemplary network log for an edge device in accordance with an embodiment of the present invention.

DETAILED DESCRIPTION

Real-time analytics are necessary in industrial environments for timely detection of production issues and recommendation of immediate corrective actions. However, devices in the Industrial Internet of Things (IIoT), such as manufacturing devices or production devices, often produce high data flow events that generate data at a high sampling rate. These high data flow events often impose restrictions on the network that make it difficult to implement enterprise decision making tools running on central servers that rely on Application Layer analysis as per the Open Systems Interconnection (OSI) model because of limited and fixed bandwidth in the static topology networks used in modern factories.

A preferred solution to this problem is detection of production issues by edge analytics. Edge analytics refers to the methodology for processing data on edge devices such as routers or switches that rely on Network Layer analysis as per the OSI model. Therefore, edge devices may act as a dual platform, performing networking functions as well as providing a platform to run analytics programs for timely detection of production issues.

To accomplish these goals, embodiments of the present invention recognize that network issues may lead to shortage of resources (e.g., shortage of memory in edge devices) thereby affecting other IIoT devices connected to the network. Embodiments of the present invention further recognize that pattern recognition using statistical, machine learning, and natural language processing techniques may enable edge devices to handle a high data flow event by reconfiguring the network, operating system, and edge analytics software threads. Embodiments of the present invention additionally recognize that edge devices may have limited processing resources such as memory, processor frequency, and others, requiring training of pattern recognition models in a central server by analysis of historical network data.

Implementation of embodiments of the invention may take a variety of forms, and exemplary implementation details are discussed subsequently with reference to the Figures.

Figure 1:
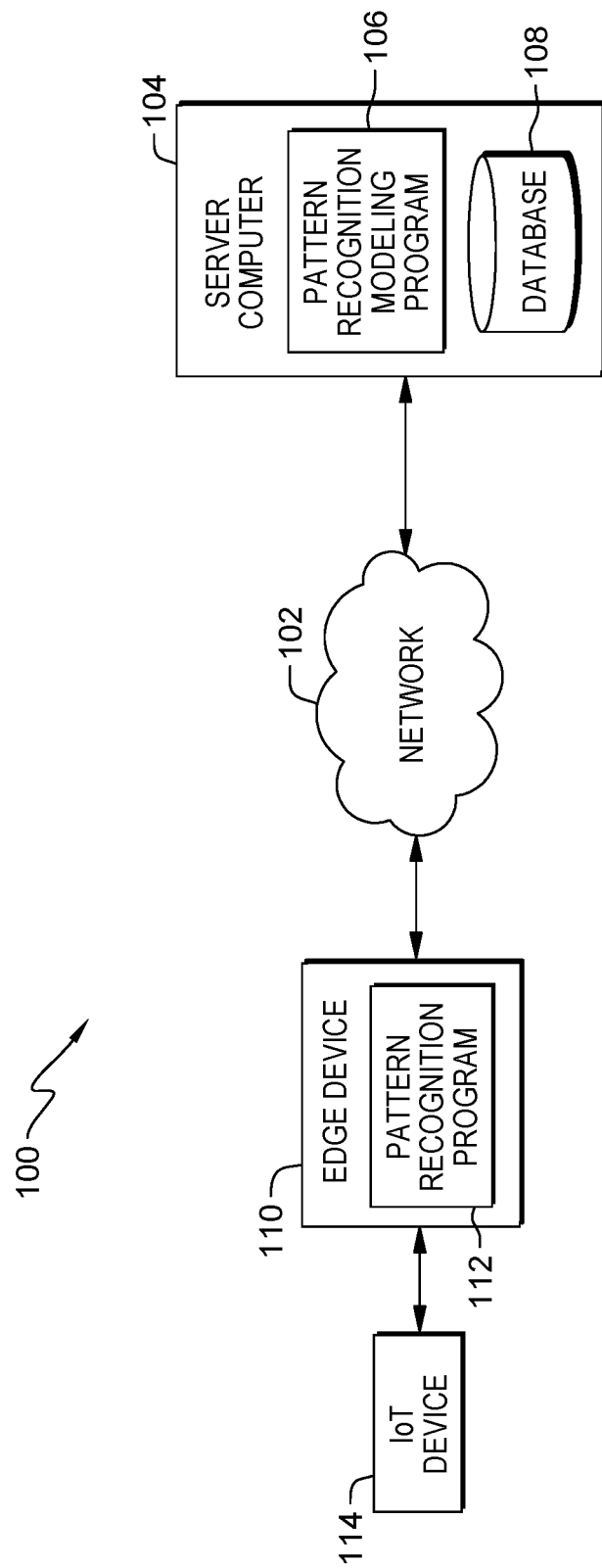
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, edge device 110, and Internet of Things (IoT) device 114, all interconnected over network 102.

In general, network 102 can be any combination of connections and protocols that will support communications between server computer 104, edge device 110, and IoT device 114, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information.

Server computer 104 can be a standalone computing device, a management server, a content services, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating with server computer 104, edge device 110, and Internet of Things (IoT) device 114, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 may include internal and external hardware components, as depicted and described in further detail with respect to FIG. 4.

Database 108 is a repository for data used by pattern recognition modeling program 106. Data used by pattern recognition modeling program 106 may include historical data captured from IoT device 114. In the depicted embodiment, database 108 resides on server computer 104. In another embodiment, database 108 may reside elsewhere within distributed data processing environment 100 provided pattern recognition modeling program 106 has access to database 108.

Server computer 104 includes pattern recognition modeling program 106 to determine a pattern recognition model for historical data from IoT device 114 stored in database 108. Some embodiments of the present invention employ pattern recognition methods based on machine learning, natural language processing, and statistical methods for early detection of a potential latency issue. In these and other embodiments, potential latency issues are detected based on sequence of events, processes, and data. Some embodiments predict the probability of a future high data flow event that will potentially cause latency problems in the network based on the historical data. Some embodiments further predict the time to the event for the high data flow event to start. Some embodiments additionally predict the memory requirements for an edge device to handle the high data flow event. Some embodiments determine a pattern recognition model trained with the historical data and deploy the model to edge device 110 for real-time detection of latency issues.

Edge device 110 may be any device used for providing IoT device 114 access to network 102. Edge device 110 includes pattern recognition program 112 to identify potential high data flow events from IoT device 114. Some embodiments of the present invention receive a model from server computer 104 and deploy it in a pattern recognition thread at edge device 110. Some embodiments process the network data from IoT device 114 in real-time to identify potential high data flow events. Some embodiments infer a high data flow event if the probability of a high data flow event is above a predetermined threshold based on the pattern recognition model received from server computer 104. Some embodiments further forecast the possible rate of data flow to quantify the memory requirements on edge device 110 to handle the high data flow event. Some embodiments may additionally: (i) temporarily reduce the subscription rate for other devices to accommodate the high data flow event; (ii) configure higher priority scheduling for the IoT device 114 associated to the high data flow event to process incoming data at a faster rate; (iii) request more memory for high data flow event through operating system calls; (iv) perform natural language processing integration in network or data layer to assess the impact of high data flow event; and (v) perform natural language processing integration in operating system to infer impact of the high data flow event and reconfigure the operating system and network system to handle the high data flow event. In some embodiments, edge device 110 may avoid latency and overhead issues by predicting the occurrence of a high data flow event based on network logs, network statistics data, and/or router or system logs. Edge device 110 may include internal and external hardware components, equivalent to those depicted and described in further detail with respect to FIG. 4.

IoT device 114 may refer to Industrial Internet of Things (IIoT) devices (e.g., manufacturing devices) interconnected through network 102. IoT device 114 may also include, without limitation, any device communicatively interconnected through network 102 such as computers, mobile devices (e.g., phones, laptops or tablets), lighting and climate control systems, cars or other vehicles and "smart" appliances (e.g., refrigerators, televisions) where some or all of those devices can be controlled or interacted with remotely.

Figure 2:
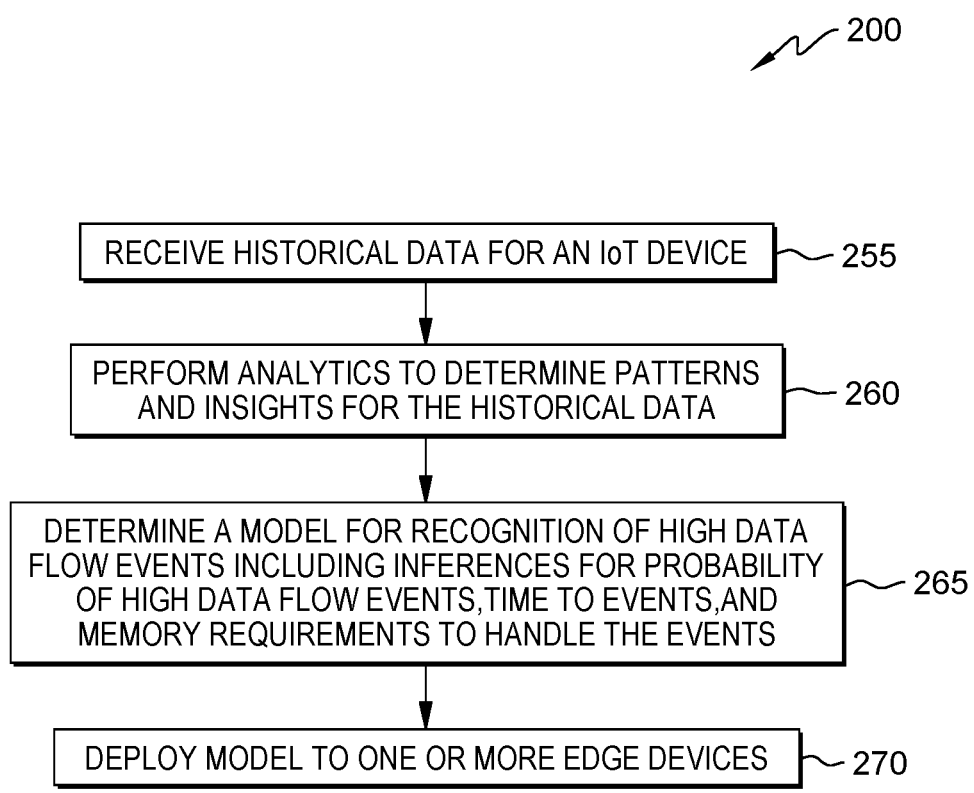
FIG. 2 is a flowchart depicting operational steps of a pattern recognition modeling program 106, on a server computer within the distributed data processing environment of FIG. 1, in accordance with an embodiment of the present invention.

Pattern recognition modeling program 106 is depicted and described in further detail with respect to FIG. 2. Referring to flowchart 200, pattern recognition modeling program 106 receives historical data to determine a pattern recognition model for the historical data of IoT device 114.

Processing begins at operation 255, where pattern recognition modeling program 106 receives historical data for an IoT device 114. In some embodiments of the present invention, pattern recognition modeling program 106 comprises historical network data from IoT device 114. In some embodiments, retrieves the historical data from database 108. In these and other embodiments, historical data may be initially captured and stored on database 108 from IoT device 114 (e.g., network data or a system log). In other embodiments, historical data may initially be captured from edge device 110. In these and other embodiments, capture of historical data from edge device 110 may include mirror ports, simple network management protocol (SNMP) traps, system logs, network taps, and any other suitable hardware or software method for capturing network traffic. In other embodiments, historical data may be captured and aggregated on a router or similar network device. In an exemplary embodiment, the historical data may include network statistics logs such as the network log shown in FIG. 6.

Processing continues at operation 260, where pattern recognition modeling program 106 performs analytics to determine patterns and insights for the historical data. In some embodiments of the present invention, pattern recognition modeling program 106 uses pattern recognition methods to overcome the issue of latency in static topology edge networks. In yet other embodiments, pattern recognition modeling program 106 includes analytics such as natural language processing (NLP), machine learning, and statistical algorithms to identify high data flow events. In still other embodiments, high data flow events may be predicted based on regressions, decision trees, and/or forecasting methods. In some embodiments, high data flow events may be predicted based on communication between edge device 110 and a prediction engine (not shown) via an application programming interface (API) call. In these and other embodiments, the prediction engine may be hosted in the cloud or locally.

Processing proceeds at operation 265, where pattern recognition modeling program 106 determines a model for recognition of high data flow events including inferences for probability of high data flow events, the item to the events, and the memory requirements to handle the event. In some embodiments of the present invention, pattern recognition modeling program 106 predicts the probability of a future data flow event that will cause IoT device 114 to generate data at a high sampling rate and potentially causing latency problems. In some embodiments, pattern recognition modeling program 106 further predicts the time to the high data flow event and the memory requirements to handle the event. In some embodiments, these predictions are used by edge device 110 to reconfigure its network settings to manage the high data flow event. In other embodiments, pattern recognition modeling program 106 further predicts other metrics such as the duration of the event.

Processing continues at operation 270, where pattern recognition modeling program 106 deploys the model to one or more edge devices. In some embodiments of the present invention, pattern recognition modeling program 106 deploys the model to edge device 110 for recognition of high data flow events from IoT device 114. In some embodiments, the model runs on a pattern recognition thread on edge device 110 that integrates the model into the configuration and runtime of edge device 110. In other embodiments, the model is deployed to edge device 110 in a sparse way (e.g., at a frequency of 15 minutes). In other embodiments, the model is deployed to edge device 110 once during offline development. For example, if the data exhibits a behavior that is static over time, the model can be deployed just once during offline development.

Figure 3:
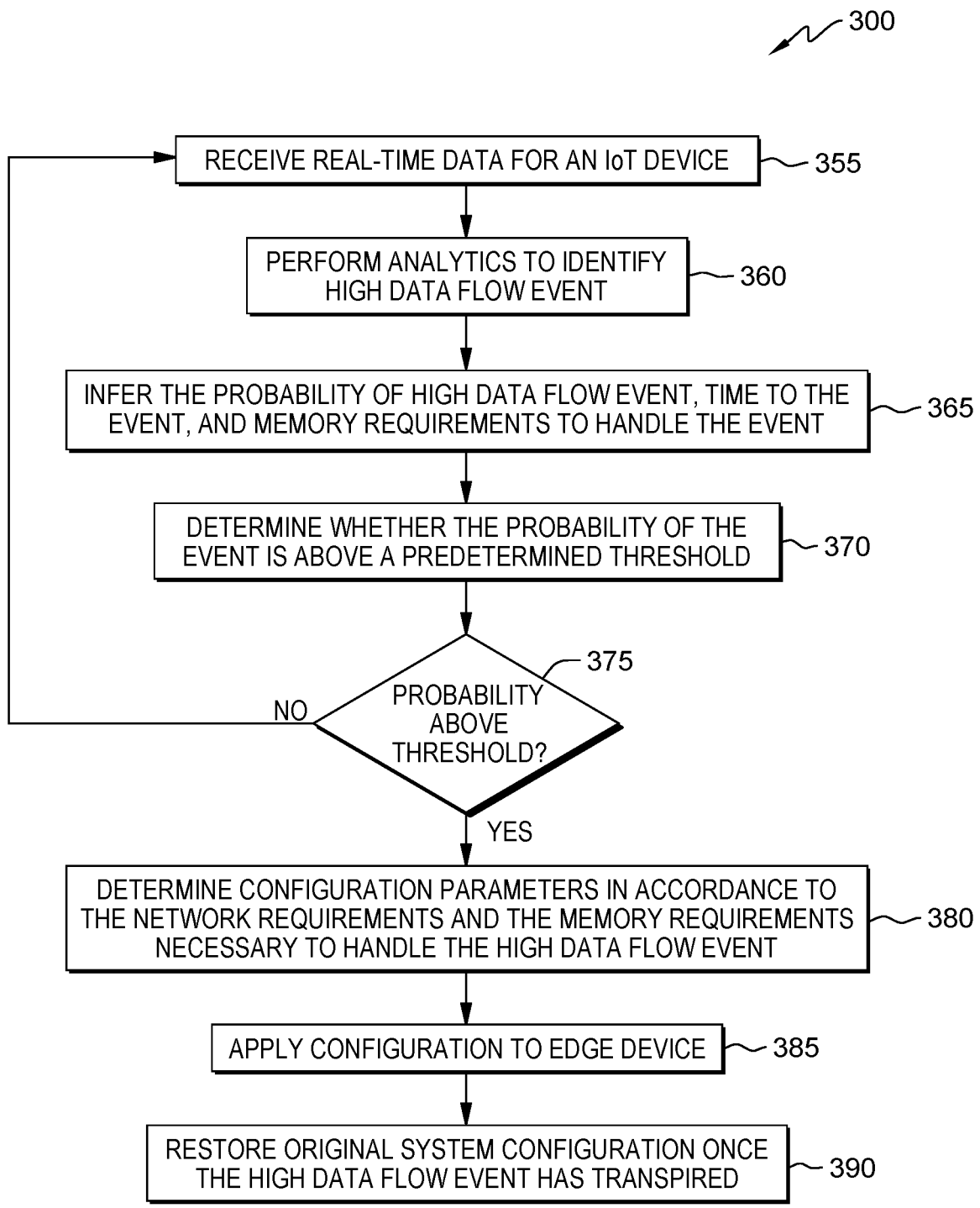
FIG. 3 illustrates operational steps of a pattern recognition modeling program 112, on an edge device within the distributed data processing environment of FIG. 1, in accordance with an embodiment of the present invention.

Pattern recognition program 112 is depicted and described in further detail with respect to FIG. 3. Referring to flowchart 300, pattern recognition program 112 receives real-time data from IoT device 114 and recognizes a high data flow event based on the model deployed from server computer 104.

Processing begins at operation 355, where pattern recognition program 112 receives real-time data from IoT device 114. In some embodiments of the present invention, IoT device 114 is connected to network 102 through edge device 110. In some embodiments, pattern recognition program 112 runs as a thread on edge device 110. In these and other embodiments, pattern recognition program 112 reads the network statistics for the network traffic received on edge device 110 in order to identify one or more high data flow events from IoT device 114. In some embodiments, edge device 110 may avoid latency and overhead issues by predicting the occurrence of a high data flow event based on network logs, network statistics data, and/or router or system logs. In an exemplary embodiment, pattern recognition program 112 receives a network log as depicted in FIG. 6.

Figure 5A:
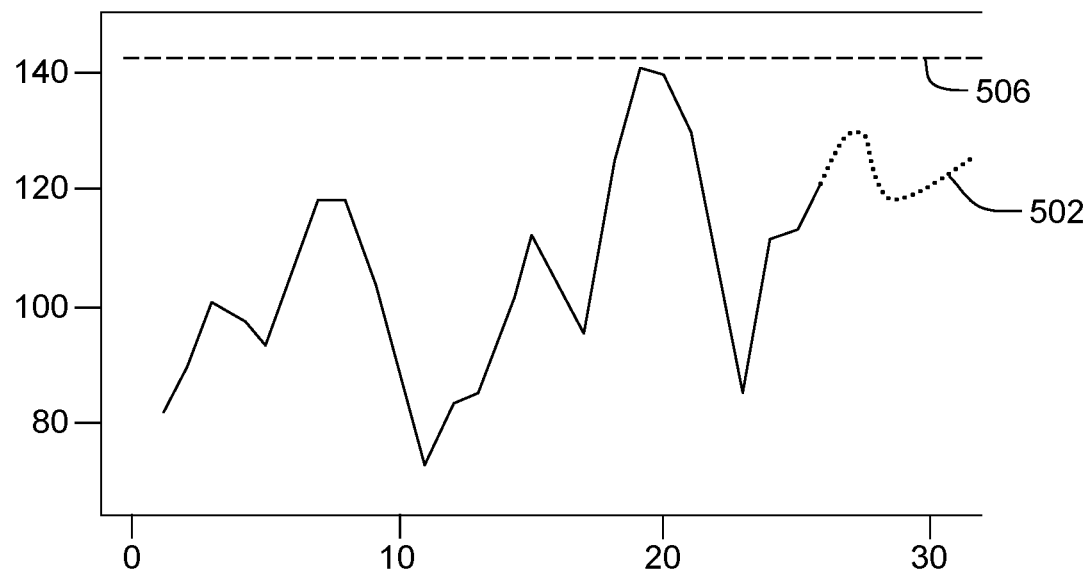
FIG. 5A illustrates a forecasting method in accordance with an embodiment of the present invention.
Figure 5B:
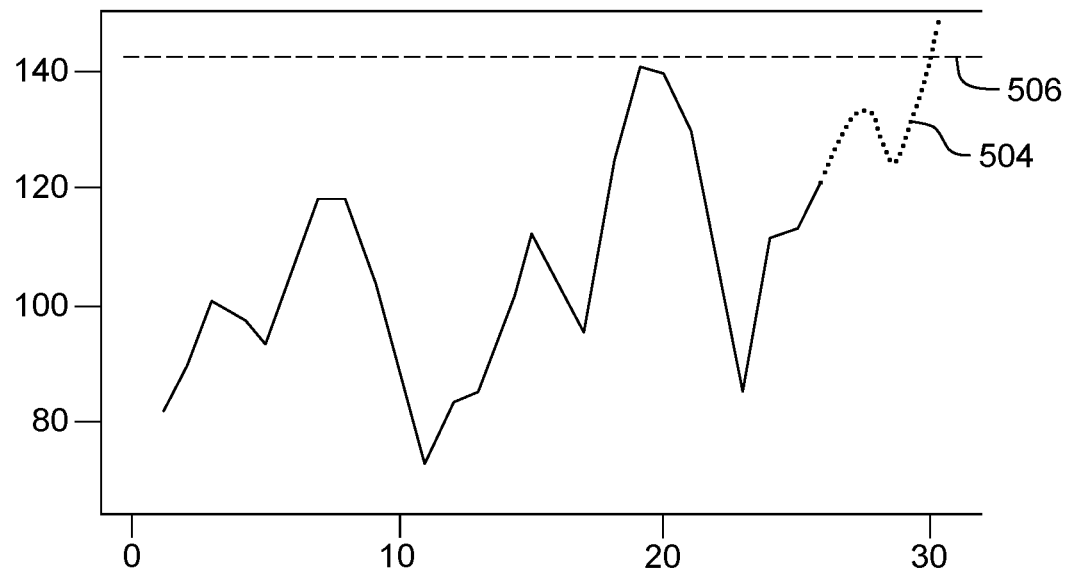
FIG. 5B illustrates a forecasting method in accordance with an embodiment of the present invention.

Processing continues at operation 360, where pattern recognition program 112 performs analytics to identify a potential high data flow event. In some embodiments of the present invention, pattern recognition program 112 identifies potential high data flow events in accordance with the model deployed from server computer 104. In some embodiments, pattern recognition program 112 performs natural language processing methods to identify insights from the network data and the operating system logs. In other embodiments, real-time data may be processed in edge device 110 without pushing the data to any other edge device. In yet other embodiments, pattern recognition program 112 includes analytics such as natural language processing, machine learning, and statistical algorithms to identify high data flow events in accordance with the deployed model from server computer 104. In still other embodiments, pattern recognition program 112 executes analytics in a sparse way (e.g., at a frequency of 15 minutes). Continuing our exemplary embodiment, pattern recognition program 112 extracts the size of packets received from IoT device 114 a network log as shown in FIG. 6. In one alternative embodiment, depicted in FIG. 5A, pattern recognition program 112 generates forecast 504 based on the size of packets received from IoT device 114. In another alternative embodiment, depicted in FIG. 5B, pattern recognition program 112 generates forecast 502 based on the size of packets received from IoT device 114.

Processing proceeds at operation 365, where pattern recognition program 112 infers probability of the high data flow event, time to the event, and memory requirements to handle the event, based on the deployed model. In some embodiments of the present invention, pattern recognition program 112 identifies potential high data flow events in accordance with the model deployed from server computer 104. In some embodiments of the present invention, pattern recognition program 112 predicts the probability of a future data flow event that will cause IoT device 114 to generate data at a high sampling rate and potentially causing latency problems. In some embodiments, pattern recognition program 112 further predicts the time to the high data flow event and the memory requirements to handle the event. In some embodiments, these predictions are used by edge device 110 to reconfigure its network settings to manage the high data flow event. In other embodiments, pattern recognition program 112 further predicts other metrics such as the duration of the event. Continuing our exemplary embodiment depicted in FIG. 5A and FIG. 5B, pattern recognition program 112 generates forecast 502 and forecast 504. Both of these forecasts include a time and a duration of the inferred high data flow event.

Processing continues at operation 370, where pattern recognition program 112 determines whether the probability of the high data flow event is above a predetermined threshold. In some embodiments of the present invention, pattern recognition program 112 determines the probability of the high data flow event in accordance with the deployed model from pattern recognition modeling program 106. If the probability of the high data flow event is below the predetermined threshold (step 375, "no" branch), processing proceeds at operation 355, where pattern recognition program 112 further receives real-time data from IoT device. If the probability of the high data flow event is above the predetermined threshold (step 375, "yes" branch), processing proceeds at operation 380, where pattern recognition program 112 determines configuration parameters in accordance to the network requirements and the memory requirements necessary to handle the high data flow event. Continuing our exemplary embodiment depicted in FIG. 5A, pattern recognition program 112 infers a low probability of a high data flow event based on forecast 502 in comparison with threshold 506. In our exemplary embodiment depicted in FIG. 5B, infers a high probability of a high data flow event based on forecast 504 in comparison with threshold 506.

Processing proceeds at operation 385, where pattern recognition program 112 applies the configuration to edge device 110. In some embodiments of the present invention, pattern recognition program 112 forecasts the possible rate of data flow to quantify the memory requirements on edge device 110 to handle the high data flow event and reconfigures the device according to the forecasted requirements. In other embodiments, pattern recognition program 112 may additionally: (i) temporarily reduce the subscription rate for other devices to accommodate the high data flow event; (ii) configure higher priority scheduling for the IoT device 114 associated to the high data flow event to process incoming data at a faster rate; (iii) request more memory for high data flow event through operating system calls; (iv) perform natural language processing integration in network or data layer to assess the impact of high data flow event; and (v) perform natural language processing integration in operating system to infer impact of the high data flow event and reconfigure the operating system and network system to handle the high data flow event.

Processing proceeds at operation 390, where pattern recognition program 112 restores the original configuration to edge device 110 once the high data flow event has transpired. In some embodiments of the present invention, pattern recognition program 112 copies the original configuration of edge device 110 to a temporary file and restores the original configuration after the high data flow event has ended. In some embodiments, pattern recognition program 112 restores the original configuration after a predetermined amount of time. In other embodiments, pattern recognition program 112 the predetermined amount of time may be based on the forecasted duration of the high data flow event.

Figure 4:
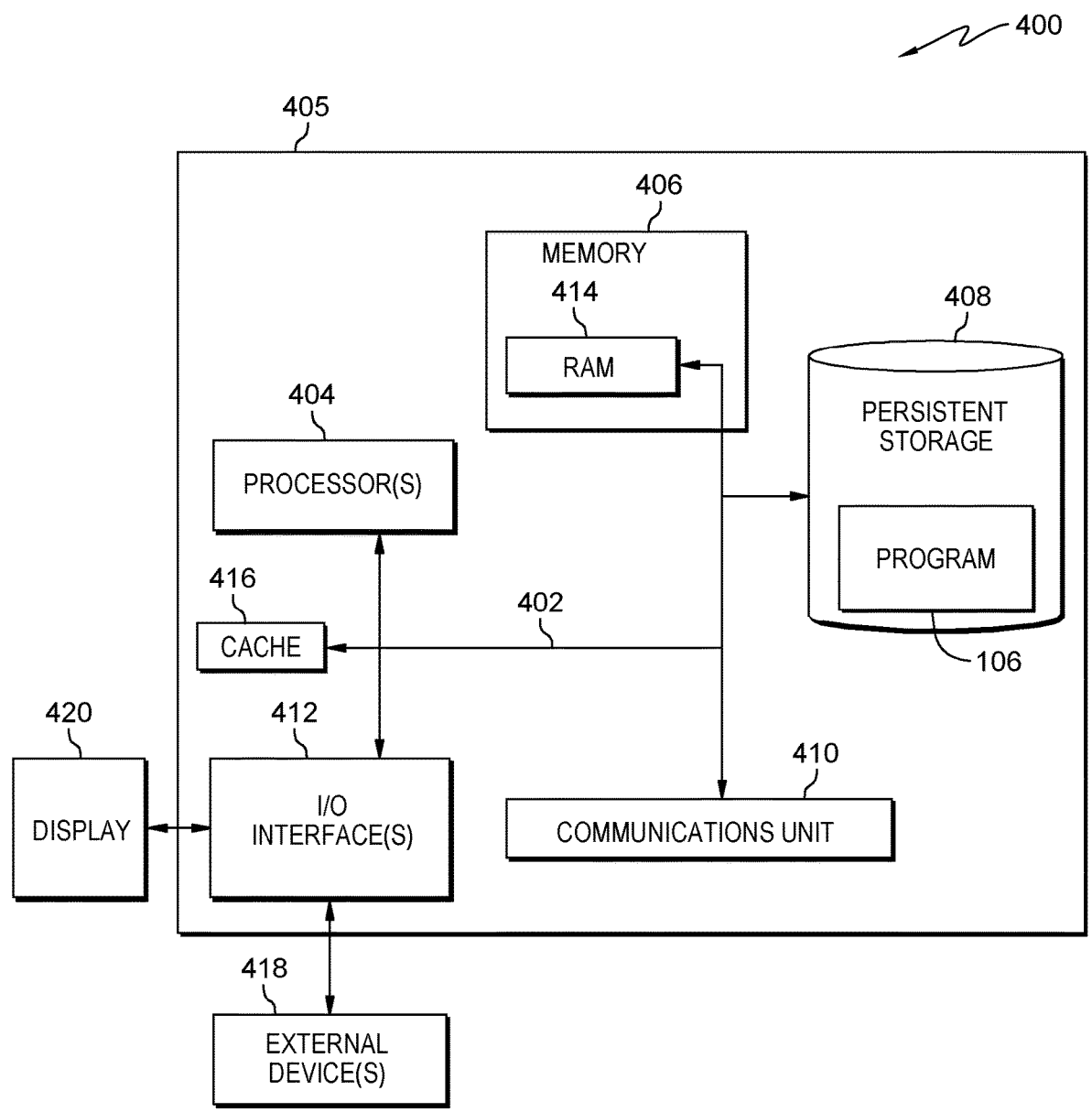
FIG. 4 depicts a block diagram of components of the server computer executing the pattern recognition modeling program 106 or the pattern recognition modeling program 112 within the distributed data processing environment of FIG. 1, in accordance with an embodiment of the present invention.

FIG. 4 depicts block diagram 400 of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 405 and server computer 104 include communications fabric 402, which provides communications between computer processor(s) 404, memory 406, persistent storage 408, communications unit 410, and input/output (I/O) interface(s) 412.

Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Pattern recognition modeling program 106 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Pattern recognition modeling program 106 may be downloaded to persistent storage 408 through communications unit 410.

I/O interface(s) 412 allows for input and output of data with other devices that may be accessible to computing device 405 and server computer 104, such as edge device 110 and IoT device 114, and other computing devices (not shown). For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., pattern recognition modeling program 106 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more processors of an edge device, from a central server computer, a machine learning model, wherein the machine learning model is trained using historical network data and historical configuration parameters implemented by the central server computer in response to the historical network data;

deploying, by one or more processors of the edge device, the machine learning model on the edge device by integrating the machine learning model into configuration and runtime of the edge device;

receiving, by one or more processors of the edge device, a first set of network data;

utilizing, by one or more processors of the edge device, the machine learning model to determine, based, at least in part, on the first set of network data: (i) a probability of a high data flow event, (ii) a time to the high data flow event, and (iii) a forecasted duration of the high data flow event;

determining that the probability of the high data flow event is above a predetermined threshold;

based, at least in part, on the probability of the high data flow event being above the predetermined threshold, updating, by one or more processors of the edge device, a configuration parameter for the edge device, where updating the configuration parameter includes performing natural language processing to infer an impact of the high data flow event and modifying the configuration parameter to handle the high data flow event;

processing, by one or more processors of the edge device, the first set of network data according to the updated configuration parameter; and restoring, by one or more processors of the edge device, an original configuration parameter for the edge device after a period of time based, at least in part, on the forecasted duration of the high data flow event.

2. The method of claim 1, wherein the first set of network data includes: network logs, network statistics data, and system logs.

3. The method of claim 1, wherein the updated configuration parameter includes: (i) a configuration parameter for temporarily reducing a subscription rate; (ii) a configuration parameter for high priority scheduling; and (iii) a configuration parameter for requesting more memory.

4. The method of claim 1, wherein the machine learning model determines the probability of the high data flow event based, at least in part, on a regression and on a decision tree performed on the first set of network data.

5. The method of claim 1, wherein the machine learning model is executed on a pattern recognition thread of the edge device.

6. The method of claim 1, wherein the edge device is deployed in an Industrial Internet of Things (IIOT) network.

7. The method of claim 6, wherein the IIOT network includes an industrial climate control system.

8. The method of claim 6, wherein the first set of network data is received from a manufacturing device in the IIOT network.

9. The method of claim 6, wherein the IIOT network has a static network topology.

10. The method of claim 1, wherein the edge device and the central server operate according to an Open Systems Interconnection (OSI) model.

11. The method of claim 10, wherein the edge device performs network layer analysis according the OSI model and the central server performs application layer analysis according to the OSI model.

12. A computer program product, comprising:

one or more computer readable storage media and program instructions stored on the one or more computer readable storage media, wherein the one or more computer readable storage media are not transitory signals per se, the stored program instructions comprising:

program instructions to receive, from a central server computer, a machine learning model, wherein the machine learning model is trained using historical network data and historical configuration parameters implemented by the central server computer in response to the historical network data;

program instructions to deploy the machine learning model on the edge device by integrating the machine learning model into configuration and runtime of the edge device;

program instructions to receive a first set of network data;

program instructions to utilize the machine learning model to determine, based, at least in part, on the first set of network data: (i) a probability of a high data flow event, (ii) a time to the high data flow event, and (iii) a forecasted duration of the high data flow event;

program instructions to determine that the probability of the high data flow event is above a predetermined threshold;

program instructions to, based, at least in part, on the probability of the high data flow event being above the predetermined threshold, update a configuration parameter for the edge device, where updating the configuration parameter includes performing natural language processing to infer an impact of the high data flow event and modifying the configuration parameter to handle the high data flow event;

program instructions to process the first set of network data according to the updated configuration parameter; and program instructions to restore an original configuration parameter for the edge device after a period of time based, at least in part, on the forecasted duration of the high data flow event.

13. The computer program product of claim 12, wherein the first set of network data includes: network logs, network statistics data, and system logs.

14. The computer program product of claim 12, wherein the updated configuration parameter includes: (i) a configuration parameter for temporarily reducing a subscription rate; (ii) a configuration parameter for high priority scheduling; and (iii) a configuration parameter for requesting more memory.

15. The computer program product of claim 12, wherein the machine learning model determines the probability of the high data flow event based, at least in part, on a regression and on a decision tree performed on the first set of network data.

16. The computer program product of claim 12, wherein the machine learning model is executed on a pattern recognition thread of the edge device.

17. A computer system, comprising:
one or more computer processors;
one or more computer readable storage devices;
program instructions stored on the one or more computer readable storage devices for execution by at least one of the one or more computer processors, the stored program instructions comprising:
  program instructions to receive, from a central server computer, a machine learning model, wherein the machine learning model is trained using historical network data and historical configuration parameters implemented by the central server computer in response to the historical network data;
  program instructions to deploy the machine learning model on the edge device by integrating the machine learning model into configuration and runtime of the edge device;
  program instructions to receive a first set of network data;
  program instructions to utilize the machine learning model to determine, based at least in part, on the first set of network data: (i) a probability of a high data flow event, (ii) a time to the high data flow event, and (iii) a forecasted duration of the high data flow event;
  program instructions to determine that the probability of the high data flow event is above a predetermined threshold;
  program instructions to, based, at least in part, on the probability of the high data flow event being above the predetermined threshold, update a configuration parameter for the edge device, where updating the configuration parameter includes performing natural language processing to infer an impact of the high data flow event and modifying the configuration parameter to handle the high data flow event;
  program instructions to process the first set of network data according to the updated configuration parameter; and
  program instructions to restore an original configuration parameter for the edge device after a period of time based, at least in part, on the forecasted duration of the high data flow event.

18. The computer system of claim 17, wherein the first set of network data includes: network logs, network statistics data, and system logs.

19. The computer system of claim 17, wherein the updated configuration parameter includes: (i) a configuration parameter for temporarily reducing a subscription rate; (ii) a configuration parameter for high priority scheduling; and (iii) a configuration parameter for requesting more memory.

20. The computer system of claim 17, wherein the machine learning model determines the probability of the high data flow event based, at least in part, on a regression and on a decision tree performed on the first set of network data.

* * * * *